(12) United States Patent
Hsu et al.

(10) Patent No.: US 12,105,317 B2
(45) Date of Patent: Oct. 1, 2024

(54) ELECTRONIC DEVICE

(71) Applicant: InnoLux Corporation, Miao-Li County (TW)

(72) Inventors: Shih-Ching Hsu, Miao-Li County (TW); Hsin-Hung Chen, Miao-Li County (TW); Chia-Yu Chung, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 18/164,077

(22) Filed: Feb. 3, 2023

(65) Prior Publication Data
US 2023/0288629 A1 Sep. 14, 2023

(30) Foreign Application Priority Data
Mar. 4, 2022 (CN) .......................... 202210214139.0

(51) Int. Cl.
*F21V 8/00* (2006.01)
(52) U.S. Cl.
CPC ......... *G02B 6/0088* (2013.01); *G02B 6/0068* (2013.01)
(58) Field of Classification Search
CPC .. G02B 6/0088; G02B 6/0068; G02B 6/2848; G02B 6/2817; G02B 6/32
See application file for complete search history.

(56) References Cited

U.S. PATENT DOCUMENTS

2022/0057567 A1* 2/2022 Li .......................... G02B 6/0053

FOREIGN PATENT DOCUMENTS

| CN | 104089216 A | 10/2014 |
|---|---|---|
| TW | 200600897 A | 1/2006 |
| TW | 201415134 A | 4/2014 |
| TW | 201541155 A | 11/2015 |
| TW | 201800818 A | 1/2018 |
| WO | 2016167207 A | 10/2016 |

OTHER PUBLICATIONS

WO 2016167207 A1 machine translation (Year: 2016).*

* cited by examiner

*Primary Examiner* — Anne M Hines
*Assistant Examiner* — Jose M Diaz
(74) *Attorney, Agent, or Firm* — MUNCY, GEISSLER, OLDS & LOWE, PC

(57) ABSTRACT

An electronic device includes a light guide plate, a plurality of light sources, a sealant frame and at least an optical film. The light guide plate includes a first end portion and a second end portion opposite to each other. The plurality of light sources are disposed adjacent to the second end portion and are arranged along the first direction. The sealant frame is disposed adjacent to the first end portion. One of the at least an optical film includes a body portion and a lug portion connected to the body portion, and the lug portion is fixed on the sealant frame. The body portion includes a first side adjacent to the sealant frame and, in a second direction, a shortest distance between the first side and the sealant film is in a range of 0 mm to 0.4 mm.

19 Claims, 7 Drawing Sheets

ELECTRONIC DEVICE

CROSS REFERENCE TO RELATED APPLICATION

This application claims the benefits of the Chinese Patent Application Serial Number 202210214139.0, filed on Mar. 4, 2022, the subject matter of which is incorporated herein by reference.

BACKGROUND

1. Field of the Disclosure

The present disclosure relates to an electronic device and, more particularly, to an electronic device including a backlight module.

2. Description of Related Art

The electronic device includes a backlight module. Generally, the light guide plate and the back plate in the backlight module may be fixed to one side of the backlight module by means of adhesive. The optical film and the sealant frame in the backlight module are fixed at a position on the other side of the backlight module, for example. Because there is usually a need to reserve a space for expansion and contraction on the non-fixed side of the optical film, a scattering phenomenon may occur when the light emitted by the light source of the backlight device is projected onto the adhesive fixed between the light guide plate and the back plate, and the scattered light may be exposed from the non-fixed side of the optical film, causing the backlight device to have a bright line problem. Therefore, there is a need for an improved electronic device to mitigate and/or obviate the aforementioned problems.

SUMMARY

The present disclosure provides an electronic device, which includes: a light guide plate having a first end portion and a second end portion opposite to each other; a plurality of light sources adjacent to the second end portion and arranged along a first direction; a sealant frame adjacent to the first end portion; and at least one optical film, wherein one of the at least one optical film has a body portion and a lug portion connected to the body portion, and the lug portion is fixed on the sealant frame, wherein the body portion has a first side adjacent to the sealant frame and, in a second direction perpendicular to the first direction, a shortest distance between the first side and the sealant frame is in a range of 0 mm to 0.4 mm.

Other novel features of the disclosure will become more apparent from the following detailed description when taken in conjunction with the accompanying drawings.

DETAILED DESCRIPTION OF EMBODIMENT

Figure 1:
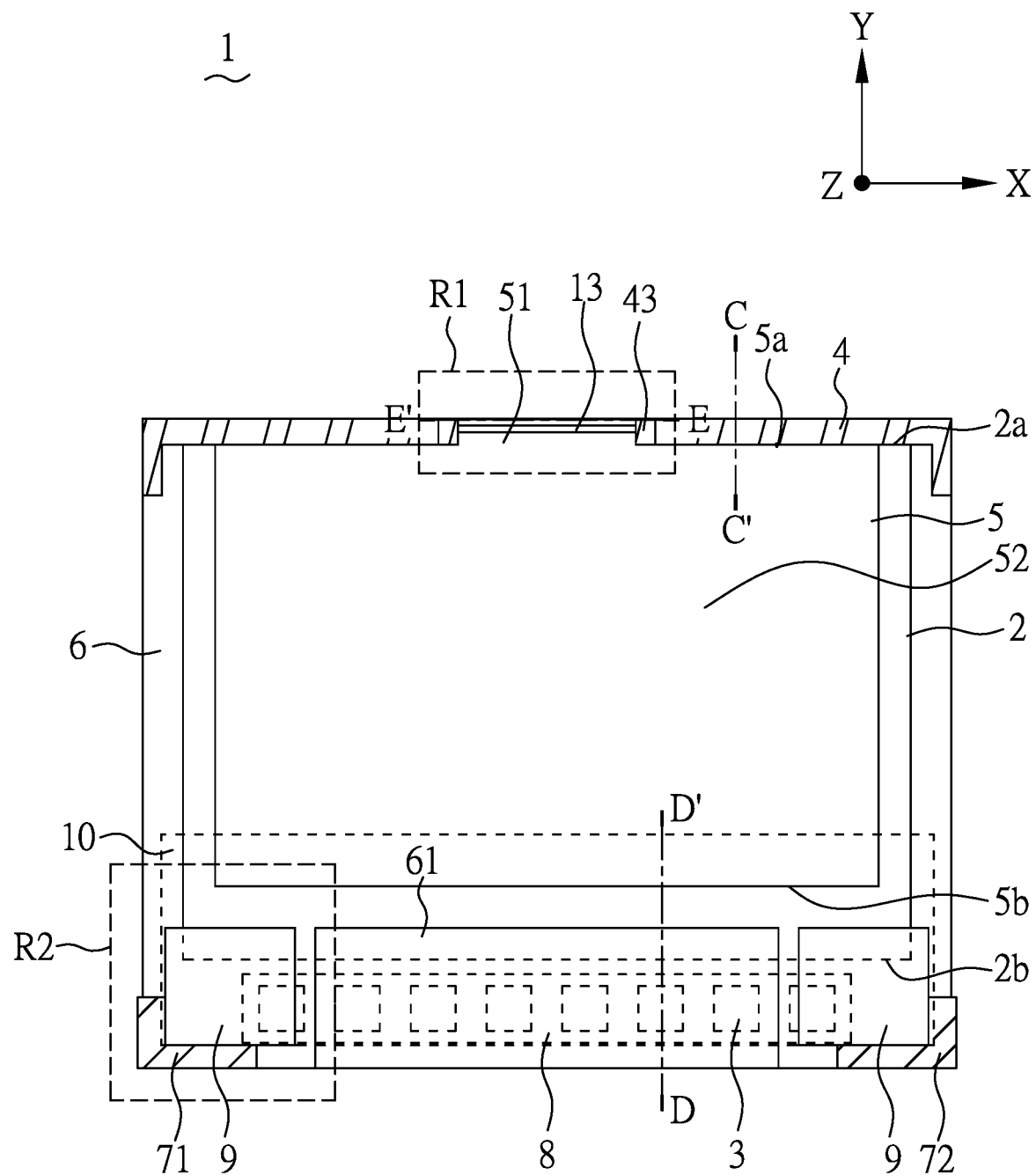
FIG. 1 is a schematic diagram (top view) of the electronic device according to an embodiment of the present disclosure.

The implementation of the present disclosure is illustrated by specific embodiments to enable persons skilled in the art to easily understand the other advantages and effects of the present disclosure by referring to the disclosure contained therein. The present disclosure is implemented or applied by other different, specific embodiments. Various modifications and changes can be made in accordance with different viewpoints and applications to details disclosed herein without departing from the spirit of the present disclosure.

It is noted that, in the specification and claims, unless otherwise specified, having "one" element is not limited to having a single said element, but one or more said elements may be provided.

In addition, in the specification and claims, unless otherwise specified, ordinal numbers, such as "first" and "second", used herein are intended to distinguish components rather than disclose explicitly or implicitly that names of the components bear the wording of the ordinal numbers. The ordinal numbers do not imply what order a component and another component are in terms of space, time or steps of a manufacturing method. These ordinal numbers are used only to distinguish one element with a particular name from another element with the same name.

In addition, the term "adjacent" used herein may refer to describe mutual proximity and does not necessarily mean mutual contact In addition, the description of "when . . . " or "while . . . " in the present disclosure means "now, before, or after", etc., and is not limited to occurrence at the same time. In the present disclosure, the similar description of "disposed on" or the like refers to the corresponding positional relationship between the two components, and does not limit whether there is contact between the two components, unless specifically limited. Furthermore, when the present disclosure recites multiple effects, if the word "or" is used between the effects, it means that the effects can exist independently, but it does not exclude that multiple effects can exist at the same time.

In addition, the terms "connect" or "couple" in the specification and claims not only refer to direct connection with another component, but also indirect connection with another component, or refer to electrical connection. Besides, the electrical connection may include a direct connection, an indirect connection, or a mode in which two components communicate through radio signals.

In addition, in the specification and claims, the term "almost", "about", "approximately" or "substantially" usually means within 20%, 10%, 5%, 3%, 2%, 1% or 0.5% of a given value or range. The quantity the given value is an approximate quantity, which means that the meaning of "almost", "about", "approximately" or "substantially" may still be implied in the absence of a specific description of "almost", "about", "approximately" or "substantially". In addition, the terms "ranging from the first value to the second value" and "range between the first value and the second value" indicate that the range includes the first value, the second value, and other values between the first value and the second value.

In addition, the technical features of different embodiments disclosed in the present disclosure may be combined to form another embodiment.

In addition, the electronic device disclosed in the present disclosure may include a display device, a backlight device, an antenna device, a sensing device, a tiled device, a touch display device, a curved display device, or a free shape display device, but is not limited thereto. The electronic device may include liquid crystal, light emitting diode, fluorescence, phosphor, other suitable display medium, or a combination thereof, but it is not limited thereto. The display device may be a non-self-luminous display device or a self-luminous display device. The antenna device may be a liquid crystal antenna device or a non-liquid crystal antenna device, and the sensing device may be a sensor for sensing capacitance, light, heat or ultrasonic waves, but it is not limited thereto. Electronic components may include passive and active components, such as capacitors, resistors, inductors, diodes, transistors, etc. The diodes may include light emitting diodes (LEDs) or photodiodes. The light emitting diodes may include, for example, organic light emitting diodes (OLEDs), mini light emitting diodes (mini LEDs), micro light emitting diodes (micro LEDs), or quantum dot light emitting diodes (quantum do LEDs), but it is not limited thereto. The tiled device may be, for example, a display tiled device or an antenna tiled device, but it is not limited thereto. It is noted that, the electronic device may be any arrangement and combination of the foregoing, but it is not limited thereto. In addition, the electronic device may be a bendable or flexible electronic device. It is noted that, the electronic device may be any arrangement and combination of the foregoing, but it is not limited thereto. In addition, the appearance of the electronic device may be rectangular, circular, polygonal, a shape with curved edges, or other suitable shapes. The electronic device may be provided with a peripheral system such as a driving system, a control system, a light source system, a shelf system, etc. to support a display device, an antenna device or a tiled device. For the convenience of description, a display device will be used as the electronic device for description in the following, but the present disclosure is not limited thereto.

Figure 2:
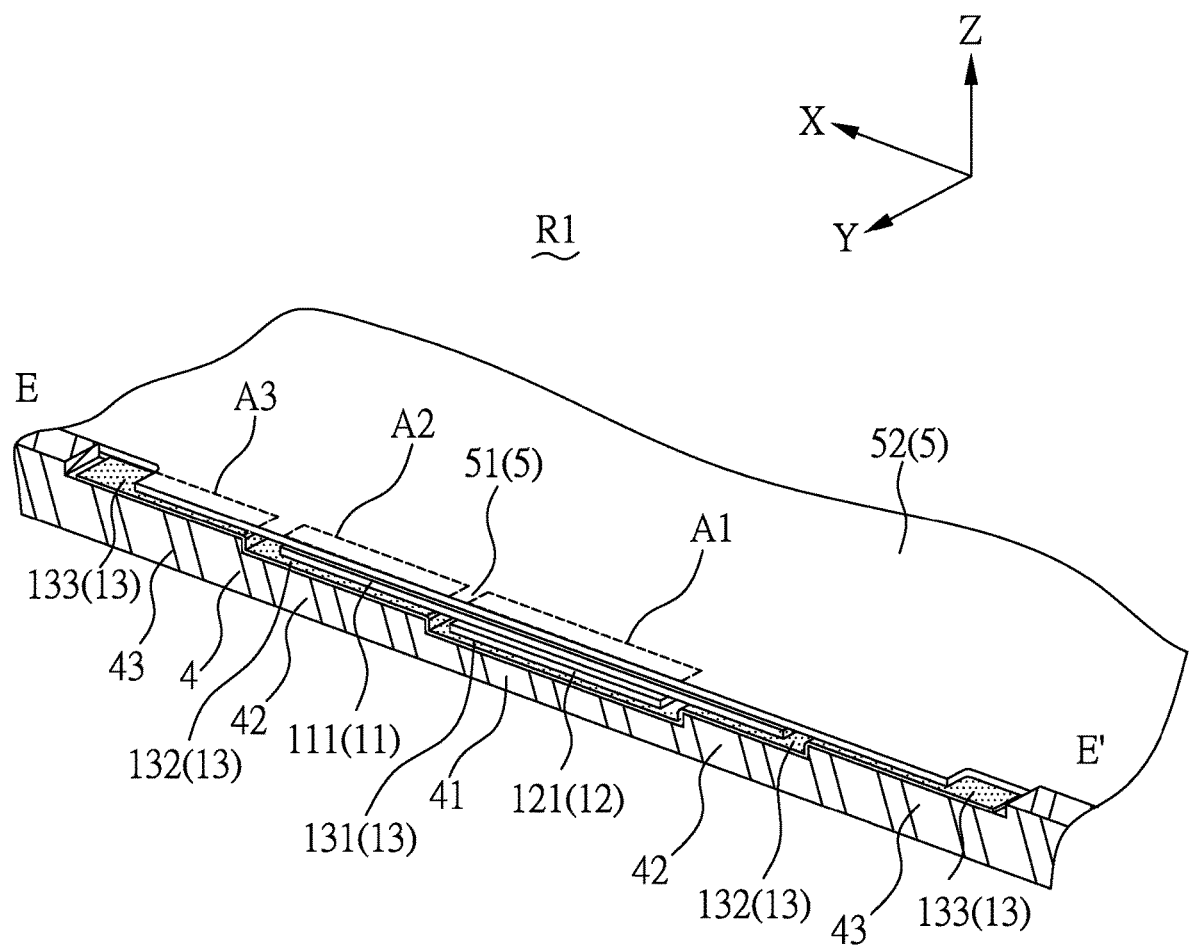
FIG. 2 is a cross-sectional view (perspective view) of the first region R1 of the electronic device in FIG. 1 taking along line E-E'.
Figure 3:
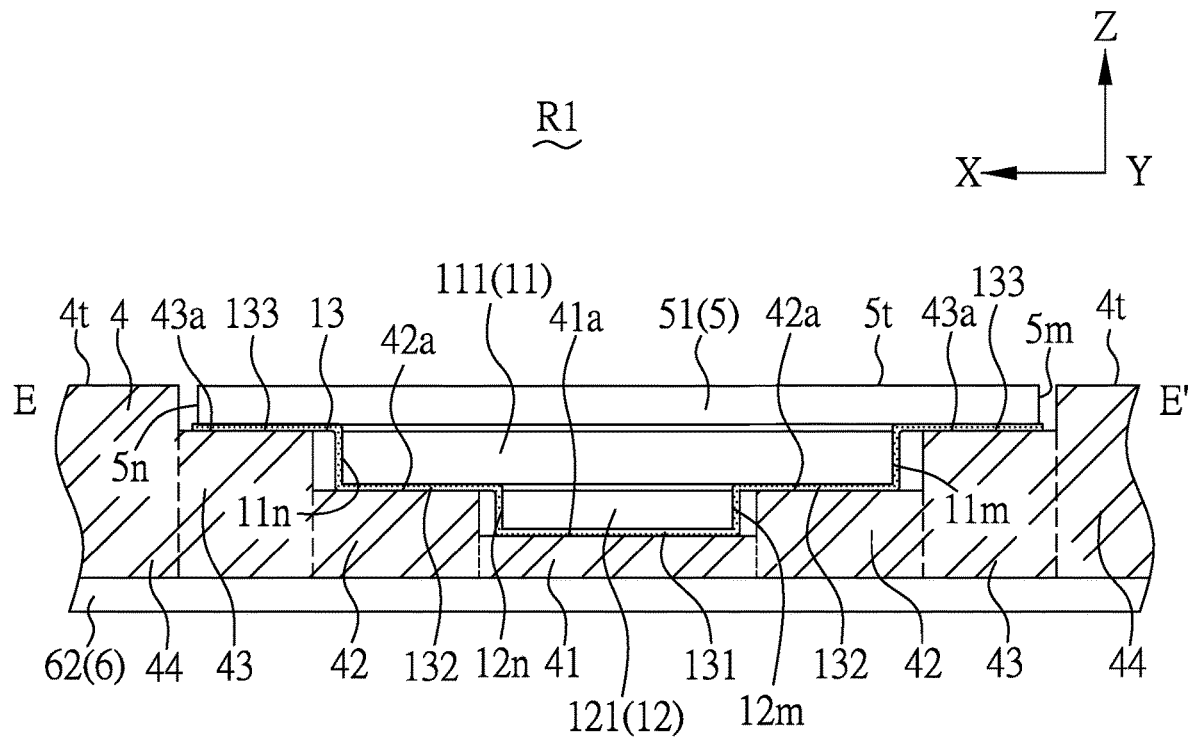
FIG. 3 is a cross-sectional view (front view) of the first region R1 of the electronic device in FIG. 1 taking along line E-E'.
Figure 4:
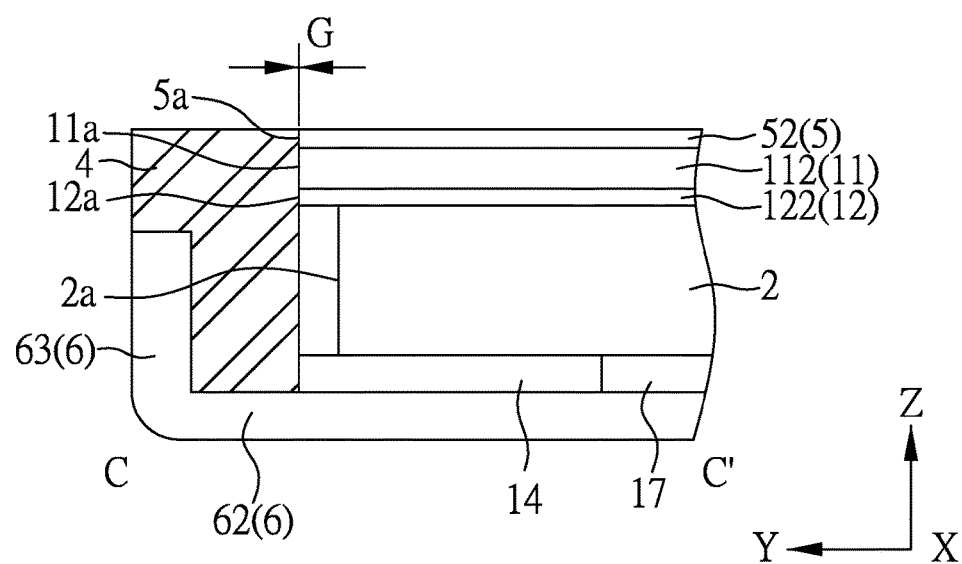
FIG. 4 is a cross-sectional view (front view) of the first region R1 of the electronic device in FIG. 1 taking along line C-C'.

Please refer to FIG. 1 to FIG. 4, in which FIG. 1 is a schematic diagram (top view) of the electronic device 1 according to an embodiment of the present disclosure, FIG. 2 is a cross-sectional view (perspective view) of the first region R1 of the electronic device in FIG. 1 taking along line E-E', FIG. 3 is a cross-sectional view (front view) of the first region R1 of the electronic device in FIG. 1 taking along line E-E', and FIG. 4 is a cross-sectional view (front view) of the first region R1 of the electronic device in FIG. 1 taking along line C-C'.

As shown in FIG. 1, the electronic device 1 includes a light guide plate 2, a plurality of light sources 3, a sealant frame 4 and at least one optical film, and the at least one optical film may include a first optical film 5, a second optical 11 or a third optical film 12. The number of the optical films is only an example but not a limitation.

The light guide plate 2 has a first end portion 2a and a second end portion 2b opposite to each other. The plurality of light sources 3 are adjacent to the second end portion 2b, and are arranged along a first direction X. The sealant frame 4 may be adjacent to the first end portion 2a. The first optical film 5 has a lug portion 51 and a body portion 52. The lug portion 52 is connected to the body portion 51, and the lug portion 52 is fixed on the sealant frame 4. The body portion 52 has a first side 5a and a second side 5b. The lug portion 52 may protrude from the first side 5a and extend in a direction away from the body portion 52. In some embodiments, in the first direction X, the width of the lug portion 52 is smaller than the width of the body portion 52. In addition, the first side 5a of the body portion 52 is adjacent to the sealant frame 4 and, in a second direction Y perpendicular to the first direction X, a shortest distance G between the first side 5a and the sealant frame 4 (shown in 4) is in a range of 0 mm (millimeter) to 0.4 mm (i.e., 0 mm≤G≤0.4 mm). In one embodiment, the first direction X is substantially perpendicular to the second direction Y. In the present disclosure, "substantially" means, for example, that a difference within 10% may be tolerated.

Similarly, as shown in FIG. 2 and FIG. 3, in one embodiment, similar to the first optical film 5, the second optical film 11 also includes a body portion (not shown) and a lug portion 111, the third optical film 12 also includes a body portion (not shown) and a lug portion 121. Similarly, the body portion (not shown) of the second optical film 11 has a first side (not shown, but corresponding to the first side 5a) and a second side (not shown, but corresponding to the second side 5b), and the lug portion 111 may protrude from the first side (not shown) and extend in a direction away from the body portion (not shown) of the second optical film 11. In some embodiments, in the first direction X, the width of the lug portion 111 is smaller than the width of the body portion (not shown) of the second optical film 11. Similarly, the body portion (not shown in the figure) of the third optical film 12 has a first side (not shown, but corresponding to the first side 5a) and a second side (not shown, but corresponding to the second side 5b), and the lug portion 121 may protrude from the first side (not shown) and extend in a direction away from the body portion (not shown) of the third optical film 12. In some embodiments, in the first direction X, the width of the lug portion 121 is smaller than the width of the body portion (not shown) of the second optical film 12. Similarly, the first side of the body portion (not shown) of the second optical film 11 (or the third optical film 12) is adjacent to the sealant frame 4 and, in the second direction Y, a shortest distance G between the first side and the sealant frames 4 is between 0 mm and 0.4 mm (i.e., 0 mm≤G≤0.4 mm). In one embodiment, the lug portion 51 of the first optical film 5, the lug portion 111 of the second optical film 11, and the lug portion 121 of the third optical film 12 may be any shape, such as a rectangle or other suitable shapes, but it is not limited thereto. In one embodiment, the lug portion 51 of the first optical film 5, the lug portion 111 of the second optical film 11, and the lug portion 121 of the third optical film 12 may have different sizes, but it is not limited thereto.

In one embodiment, as shown in FIG. 1, the electronic device 1 further includes a back plate 6, a second sealant frame 71, a third sealant frame 72, a circuit board 8, a buffer member 9 and/or a reflective element 10, while the aforementioned components are only examples, and may be arbitrarily added or removed as long as it is reasonable. The back plate 6 is used for accommodating the aforementioned components (such as but not limited to the light guide plate 2, the reflective element 10, the circuit board 8, the sealant frame 4, the first optical film 5, the second optical film 11, the third optical film 12, etc.).

Next, the configuration relationship among the aforementioned components will be described, and please refer to FIG. 1 to FIG. 5. FIG. 2 is a cross-sectional view (perspective view) of the first region R1 of the electronic device 1 in FIG. 1 taking along line E-E', wherein the first region R1 is an area capable of showing that the lug portion 51 of the first optical film 5 is fixed on the sealant frame 4.

First, the configuration relationship between the at least one optical film and the sealant frame 4 will be described, and please refer mainly to FIG. 1 to FIG. 3.

In one embodiment, the lug portion 51 of the first optical film 5, the lug portion 111 of the second optical film 11, and the lug portion 121 of the third optical film 12 may be arranged on the sealant frame 4, for example, and the sealant frame 4 may be provided with a stepped structure where the lug portion 51 of the first optical film 5, the lug portion 111 of the second optical film 11 and the lug portion 121 of the third optical film 12 are arranged, thereby properly accommodating the lug portion 51 of the first optical film 5, the lug portion 111 of the second optical film 11 and/or the lug portion 121 of the third optical film 12, but it is not limited thereto.

Please refer to FIG. 3 for a more detailed description, in which the back plate 6 may include a bottom plate 62, the sealant frame 4 may be arranged on part of the bottom plate 62, and the sealant frame 4 may include a first support portion 41, two second support portions 42 and the two third support portions 43, but it is not limited thereto. In the first direction X, the two second support portions 42 may be disposed on two sides of the first support portion 41, respectively. The two third support portions 43 may be respectively disposed on the sides of the two second support portions 42 away from the first support portion 41, For example, one of the third support portions 43 is adjacent to the side of one of the second support portions 42 away from the first support portion 41, and the other third support portion 43 is adjacent to the side of the other second support portion 42 away from the first support portion 41. In addition, the first support portion 41 has a support surface 41$a$, the two second support portions 42 each may have a support surface 42$a$, and the two third support portions 43 each may have a support surface 43$a$. Please refer to FIG. 3 and FIG. 6 at the same time, in which FIG. 6 corresponds to FIG. 3. In one embodiment, in a third direction Z that is substantially perpendicular to the first direction X and the second direction Y (that is, in the normal direction of the bottom plate 62 of the back plate 6), there is a shortest distance h2 between the support surface 42$a$ of each of the two second support portions 42 and the bottom plate 62, and the shortest distance h2 may be greater than a shortest distance h1 between the support surface 41$a$ of the first support portion 41 and the bottom plate 62 (i.e., h2>h1). In one embodiment, in the third direction Z (that is, in the normal direction of the bottom plate 62 of the back plate 6), there is a shortest distance h3 between the support surface 43$a$ of each of the two third support portions 43 and the bottom plate 62, and the shortest distance h3 may be greater than the shortest distance h2 (i.e., h3>h2). Therefore, the sealant frame 4 may have a stepped structure, but it is not limited thereto.

As shown in FIG. 2 and FIG. 3, in one embodiment, an attachment member 13 may be arranged on the first support portion 41, the two second support portions 42 and/or the two third support portions 43. A first attachment portion 131 of the attachment member 13 may be arranged on the support surface 41$a$ of the first support portion 41, two second attachment portions 132 of the attachment member 13 may be respectively arranged on the support surfaces 42$a$ of the two second support portions 42, and two third attachment portions 133 of the attachment member 13 may be respectively arranged on the support surfaces 43$a$ of the two third support portions 43, while it is not limited thereto. In one embodiment, the attachment member 13 may include an adhesive, such as a double-sided adhesive tape, but it is not limited thereto. In one embodiment, the first attachment portion 131 and the two second attachment portions 132 may be connected with or separated from each other. In one embodiment, the two second attachment portions 132 and the adjacent third attachment portions 133 may be connected with or separated from each other.

In one embodiment, the lug portion 121 of the third optical film 12 may be fixed on the support surface 41$a$ of the first support portion 41 through the first attachment portion 131. The lug portion 111 of the second optical film 11 may be fixed on the support surfaces 42$a$ of the two second support portions 42 through the two second attachment portions 132, respectively, and part of the lug portion 111 of the second optical film 11 may be arranged on the support surfaces 42$a$ of the two second support portions 42, while part of the lug portion 111 of the second optical film 11 may be arranged on the lug portion 121 of the third optical film 12, but it is not limited thereto. The lug portion 51 of the first optical film 5 may be fixed on the support surfaces 43$a$ of the two third support portions 43 through the two third attachment portions 133, respectively, and part of the lug portion 51 of the first optical film 5 may be arranged on the support surfaces 43$a$ of the two third support portions 43, while part of the lug portion 51 may be arranged on the lug portion 111, but it is not limited thereto.

As shown in FIG. 2 and FIG. 3, in one embodiment, in the third direction Z, the lug portion 51 of the first optical film 5, the lug portion 111 of the second optical film 11 and the lug portion 121 of the third optical film 12 may at least partially overlap. As shown in FIG. 3, in one embodiment, in the third direction Z, the projection area of the lug portion 51 of the first optical film 5 projected onto the bottom plate 62, the projection area of the lug portion 111 of the second optical film 11 projected area to the bottom plate 62, and the projection area of the lug portion 121 of the third optical film 12 projected to the bottom plate 62 are different, for example. In one embodiment, in the third direction Z, the projection area of the lug portion 51 of the first optical film 5 projected onto the bottom plate 62 may be greater than the projection area of the lug portion 111 of the second optical film 11 projected onto the bottom plate 62. The projection area of the lug portion 111 of the second optical film 11 projected onto the bottom plate 62 may be greater than the projection area of the lug portion 121 of the third optical film 12 projected onto the bottom plate 62. In addition, in the third direction Z, the body portion 52 of the first optical film 5, the body portion of the second optical film 11 (not shown) and/or the body portion of the third optical film 12 (not shown) may at least partially overlap.

As shown in FIG. 3, in one embodiment, in the first direction X, there is, for example, a distance (not marked) between the edge 12$n$ and/or the edge 12$m$ of the third optical film 12 and the sealant frame 4, respectively. In other embodiments (not shown), the edge may also be attached to the sealant frame 4; that is, in the first direction X, there may be no distance (not marked) between the edge 12n and/or the edge 12m and the sealant frame 4. In the first direction X, there is a distance (not marked) between the edge 11m and/or the edge 11m of the second optical film 11 and the sealant frame 4, respectively. In other embodiments (not shown), the edge may also be attached to the sealant frame 4; that is, in the first direction X, there may be no distance (not marked) between the edge 11n and/or the edge 11m and the sealant frame 4, respectively. In the first direction X, there is a distance (not marked) between the edge 5n and/or the edge 5m of the first optical film 5 and the sealant frame 4, respectively. In other embodiments (not shown), the edge may also be attached to the sealant frame 4; that is, in the first direction X, there may be no distance (not marked) between the edge 5n and/or the edge 5m and the sealant frame 4, respectively.

As shown in FIG. 3, in one embodiment, the sealant frame 4 further includes two connecting portions 44 which may be respectively disposed on the sides of the two third support portions 43 away from the second support portion 42; for example, one of the connecting portions 44 is adjacent to the side of one of the third support portions 43 away from the second support portion 42, and the other connecting portion 44 is adjacent to the side of the other third support portion 43 away from the second support portion 42. In addition, please refer to FIG. 3 and FIG. 6 at the same time (FIG. 6 corresponds to FIG. 3), in some embodiments, in the third direction Z, there is a shortest distance h4 between the surface 4t of each of the two connecting portions 44 and the bottom plate 62, and the shortest distance h4 is greater than the shortest distance h3 (i.e., h4>h3). In one embodiment, the first optical film 5 has an upper surface 5t, wherein the surface 4t of the connecting portion 44 and the upper surface 5t of the first optical film 5 may be designed to be aligned or not in the third direction Z according to requirements, but it is not limited thereto.

In one embodiment, the material of the light guide plate 2 may include poly methyl methacrylate (PMMA), cyclo olefin polymer (COP) or polycarbonate (PC), while it is not limited thereto. In one embodiment, the material of the sealant frame 4 may include non-transparent material and/or transparent material. For example, the material of the sealant frame 4 may include non-metal or plastic, or metal (such as but not limited to iron) integrally formed with plastic, while it is not limited thereto. In one embodiment, the material of the back plate 6 may include metal or alloy, such as iron, copper, aluminum, steel, etc., but it is not limited thereto, or the material of the back plate 6 may also include plastic, but it is not limited thereto.

As a result, the arrangement of the plurality of optical films and the sealant frame 4 can be understood.

Next, the configuration relationship of other components will be described, and please refer mainly to FIG. 1, FIG. 4 and FIG. 5.

As shown in FIG. 4, in one embodiment, the back plate 6 may include a bottom plate 62 and a first side plate 63 in a cross-sectional view taking along the line C-C' in FIG. 1. The first side plate 63 is, for example, connected to the bottom plate 62 and substantially extends toward the third direction Z, but it is not limited thereto. The light guide plate 2 may be arranged on the bottom plate 62 of the back plate 6, and a first attachment member 14 may be arranged between the light guide plate 2 and the bottom plate 62. The first attachment member 14 may include various adhesives, such as double-sided adhesive tape, curing adhesive or other suitable attachments, but it is not limited thereto. Part of the sealant frame 4 may be arranged on, for example, the bottom plate 62 of the back plate 6, and the other part of the sealant frame 4 may be extended and arranged on the first side plate 63 of the back plate 6. In one embodiment, the first end portion 2a of the light guide plate 2 may be arranged adjacent to the sealant frame 4 and, in the third direction Z, the light guide plate 2 and the sealant frame 4 do not overlap. In the second direction Y, there may be a gap between the light guide plate 2 and the sealant frame 4. In one embodiment, the body portion 122 of the third optical film 12 may be arranged on the light guide plate 2, for example. The body portion 112 of the second optical film 11 may be arranged on the body portion 122 of the third optical film 12. The body portion 52 of the first optical film 5 may be arranged on the body portion 112 of the second optical film 11. In one embodiment, a reflector 17 may be arranged between the bottom plate 62 and the light guide plate 2, and the material of the reflector 17 may include, for example, metal or white reflective material, but it is not limited thereto.

In one embodiment, the body portion 52 of the first optical film 5 has a first side 5a adjacent to the sealant frame 4, the body portion 112 of the second optical film 11 has a first side 11a adjacent to the sealant frame 4, and the body portion 122 of the third optical film 12 has a first side 12a adjacent to the sealant frame 4. In one embodiment, in a second direction Y perpendicular to the first direction X, a shortest distance G between the first side 5a (the first side 11a and/or the first side 12a) and the sealant frame 4 may be between 0 mm and 0.4 mm (i.e., 0 mm≤G≤0.4 mm), while it is not limited thereto. In one embodiment, the shortest distance G between the first side 5a (the first side 11a and/or the first side 12a) and the sealant frame 4 may be between 0 mm and 0.35 mm (i.e., 0 mm≤G≤0.35 mm), while it is not limited thereto. In one embodiment, the shortest distance G between the first side 5a (the first side 11a and/or the first side 12a) and the sealant frame 4 may be between 0 mm and 0.3 mm (i.e., 0 mm≤G≤0.3 mm), while it is not limited thereto. In one embodiment, the shortest distance G may also be between 0 mm and 0.05 mm (i.e., 0 mm≤G≤0.05 mm), while it is not limited thereto. In one embodiment, the shortest distances G between the first side 5a, the first side 11a and/or the first side 12a and the sealant frame 4 may be the same or different.

As shown in FIG. 3, in one embodiment, in the third direction Z, the thickness (not marked) of the body portion 52 of the first optical film 5, the thickness (not marked) of the body portion 112 of the second optical film 11 and/or the thickness (not marked) of the body portion 122 of the third optical film 12 may be the same or different. In one embodiment, the first optical film 5 and the third optical film 12 may be, for example, diffusion films, and the second optical film 11 may be, for example, a brightness enhancement film, but it is not limited thereto. In other embodiments, the first optical film 5, the second optical film 11 and/or the third optical film 12 may be optical films with different functions selected according to the actual requirements.

Figure 5:
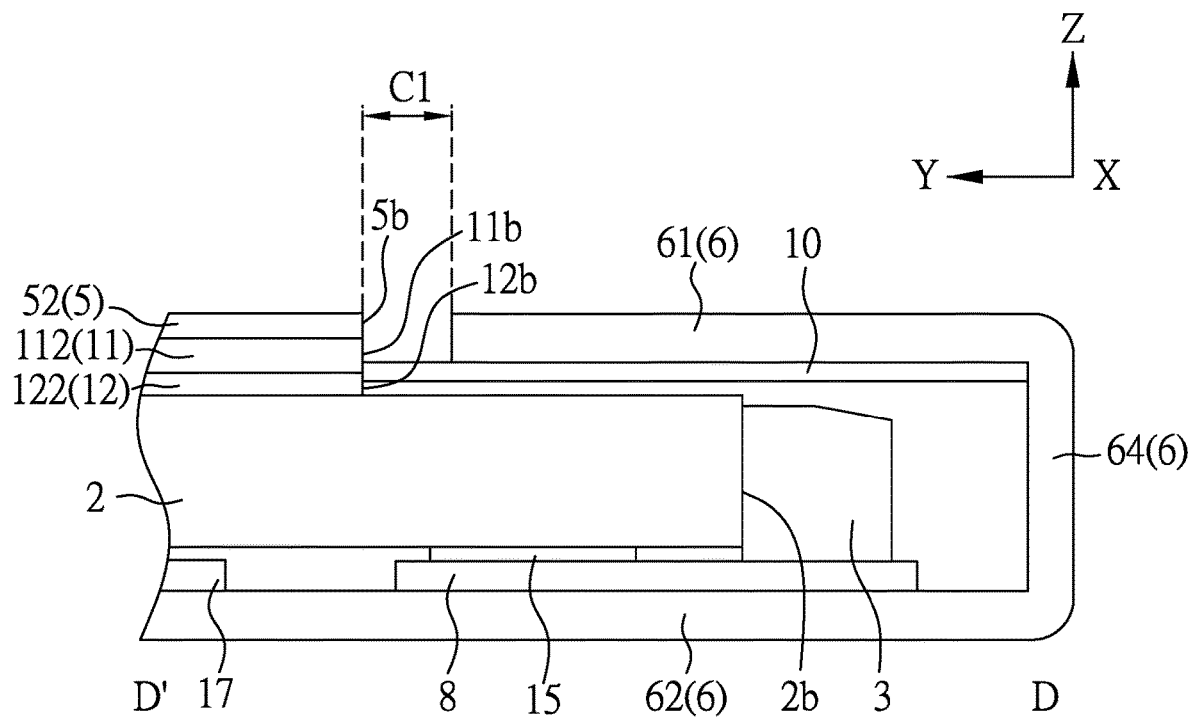
FIG. 5 is a cross-sectional view (front view) of the electronic device in FIG. 1 taking along line D-D'.

As shown in FIG. 5, in one embodiment, the back plate 6 further includes a second side plate 64 in the cross-sectional view taking along the line D-D' in FIG. 1, wherein a side of the bottom plate 62 of the back plate 6 is connected, for example, to the second side plate 64 that extends, for example, away from the bottom plate 62 substantially along the third direction Z. In addition, the back plate 6 further includes a bending portion 61 which may be connected, for example, to part of the other side of the second side plate 64, and the bending portion 61 extends, for example, away from the second side plate 64 along the second direction Y, but it is not limited thereto. In one embodiment, the circuit board 8 is arranged on the bottom plate 62. The plurality of light sources 3 are arranged on the circuit board 8 and are electrically connected to the circuit board 8. The light guide plate 2 may be arranged on the circuit board 8, and the light guide plate 2 and the circuit board 8 may be fixed to each other through an attachment member 15. The attachment member 15 may be, for example, double-sided tape, curing glue or other suitable attachments, but it is not limited thereto. In one embodiment, a reflective element 10 may be disposed on the inner side of the bending portion 61, for example, a side of the bending portion 61 adjacent to the plurality of light sources 8. In other words, the reflective element 10 may be arranged between, for example, the bending portion 61 and the circuit board 8 and/or the plurality of light sources 8. In one embodiment, the second end portion 2b of the light guide plate 2 may be adjacent to the plurality of light sources 3. As shown in FIG. 1 and FIG. 5, in one embodiment, in the third direction Z, the bending portion 61 at least partially overlaps the light guide plate 2. In one embodiment, in the third direction Z, the bending portion 61 at least partially overlaps the plurality of light sources 3.

In one embodiment, the circuit board 8 may include, for example, a flexible printed circuit (FPC) or a printed circuit board (PCB), but it is not limited thereto. In one embodiment, the light source 3 may include a light emitting diode (LED) or organic light emitting diode, but it is not limited thereto. In one embodiment, the reflective element 10 may include, for example, a reflective sheet. In one embodiment, the material of the reflective element 10 or the reflective sheet 17 may include polyethylene terephthalate (PET), but it is not limited thereto.

Figure 8:
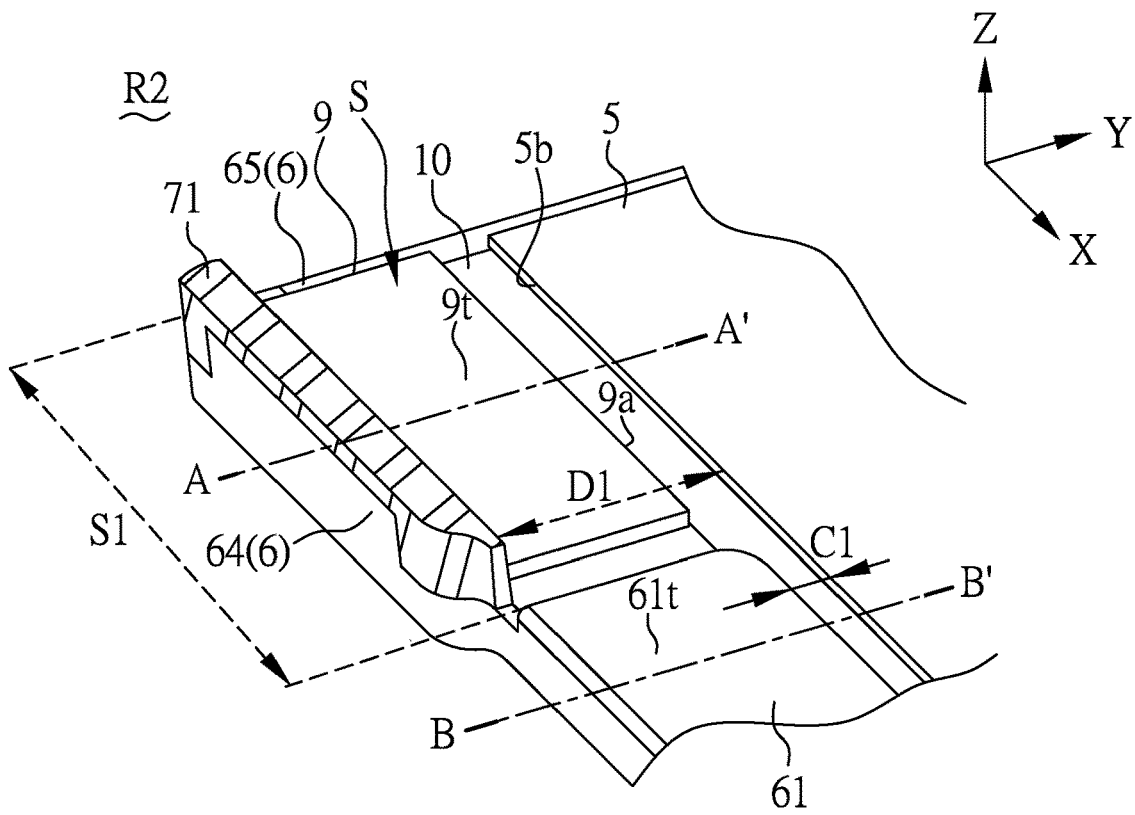
FIG. 8 is a perspective view of the second region R2 of the electronic device in FIG. 1.

In addition, in the second direction Y, the body portion 52 of the first optical film 5 has a second side 5b, the body portion 112 of the second optical film 11 has a second side 11b, and the body portion 122 of the third optical film 12 has a second side 12b, wherein the second side 5b, the second side 11b and the second side 12b may be respectively adjacent to the bending portion 61. In one embodiment (as shown in FIG. 5 or FIG. 8), in the second direction Y, the second side 5b, the second side 11b and the second side 12b may each have a shortest distance C1 from the bending portion 61. In one embodiment, in the second direction Y, the shortest distances C1 between the bending portion 61, and the second side 5b, the second side 11b and the second side 12b may be the same or different from each other.

As shown in FIG. 4 and FIG. 5, in one embodiment, in the second direction Y, the shortest distance G between the first side 5a and the sealant frame 4 may be smaller than, for example, the shortest distance C1 between the second side 5b and the bending portion 61. In one embodiment, in the second direction Y, the shortest distance G between the first side 11a and the sealant frame 4 may be smaller than, for example, the shortest distance C1 between the second side 11b and the bending portion 61. In one embodiment, in the second direction Y, the shortest distance G between the first side 12a and the sealant frame 4 may be smaller than, for example, the shortest distance C1 between the second side 12b and the bending portion 61.

As a result, the internal structure of the electronic device 1 corresponding to the cross sections formed by line C-C' and line D-D' can be understood. It is noted that the internal structure of the electronic device 1 is only an example but not a limitation.

Figure 6:
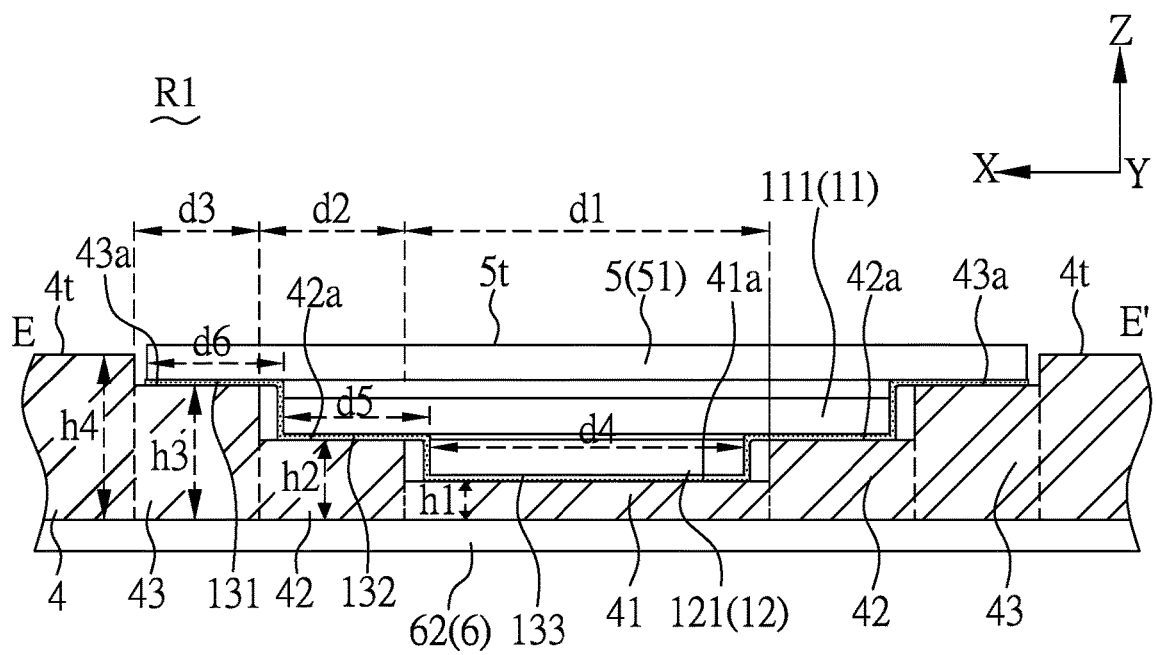
FIG. 6 is cross-sectional view (front view) of the first region R1 of the electronic device 1 in FIG. 1 taking along line E-E' that corresponds to FIG. 3.
Figure 7:
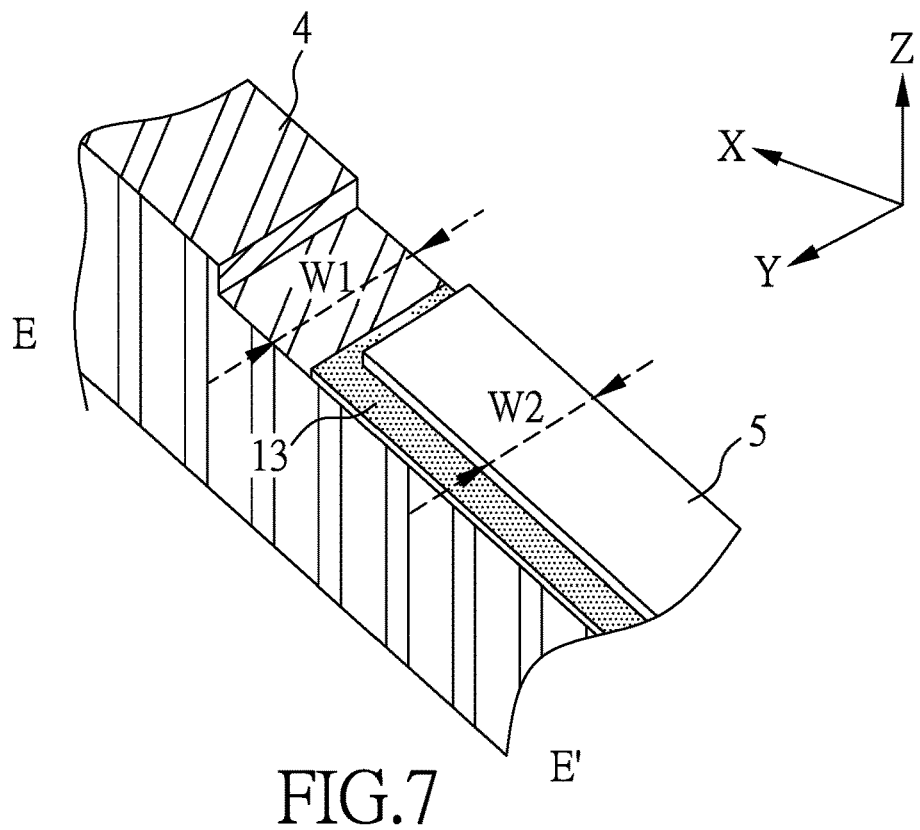
FIG. 7 is a perspective view of one of the third support portions and the first optical film shown in FIG. 6.

Next, the dimensions of the sealant frame 4, the attachment member 13, and the optical films 5, 11 and 12 are described, and please refer to FIG. 1, FIG. 2, FIG. 3, FIG. 6 and FIG. 7 at the same time. FIG. 6 is cross-sectional view (front view) of the first region R1 of the electronic device 1 in FIG. 1 taking along line E-E' that corresponds to FIG. 3. FIG. 7 is a perspective view of one of the third support portions 43 and the first optical film 5 shown in FIG. 6, which is used to represent the approximate dimensions of the sealant frame 4, the attachment member 13 and the first optical film in the second direction Y, while the second optical film 11 and/or the third optical film 12 may be designed similarly.

As shown in FIG. 6, in one embodiment, in the first direction X, the width d1 of the first support portion 41 of the sealant frame 4 may be between 20 mm and 60 mm (i.e., 20 mm≤d1≤60 mm), but it is not limited thereto. In one embodiment, in the first direction X, the width d1 may be between 30 mm and 60 mm (i.e., 30 mm≤d1≤60 mm), but it is not limited thereto. In one embodiment, in the first direction X, the width d1 may be between 35 mm and 50 mm (i.e., 35 mm≤d1≤50 mm), but it is not limited thereto.

As shown in FIG. 6, in one embodiment, in the first direction X, the width d2 of one of the two second support portions 42 of the sealant frame 4 may be between 10 mm and 30 mm (i.e., 10 mm≤d2≤30 mm), but it is not limited thereto. In one embodiment, in the first direction X, the width d2 may be between 15 mm and 25 mm (i.e., 15 mm≤d2≤25 mm), but it is not limited thereto. In one embodiment, in the first direction X, the width d2 may be between 17 mm and 23 mm (i.e., 17 mm≤d2≤23 mm), but it is not limited thereto.

In one embodiment, in the first direction X, the width d3 of one of the two third support portions 43 of the sealant frame 4 may be between 10 mm and 30 mm (i.e., 10 mm≤d3≤30 mm), but it is not limited thereto. In one embodiment, in the first direction X, the width d3 may be between 15 mm and 25 mm (i.e., 15 mm≤d3≤25 mm), but it is not limited thereto. In one embodiment, in the first direction X, the width d3 may be between 17 mm and 23 mm (i.e., 17 mm≤d3≤23 mm), but it is not limited thereto.

In addition, as shown in FIG. 2 and FIG. 6, the lug portion 121 of the third optical film 12 is fixed on the first support portion 41 through the attachment member 13, and there is a first contact area A1 (shown in FIG. 2) between the lug portion 121 of the third optical film 12 and the attachment member 13 (e.g., the first attachment portion 131). In one embodiment, the first contact area A1 may be between 10 mm² (square millimeter) and 40 mm² (i.e., 10 mm²≤A1≤40 mm²), but it is not limited thereto. In one embodiment, the first contact area A1 may be between 10 mm² and 35 mm² (i.e., 10 mm²≤A1≤35 mm²), but it is not limited thereto. In one embodiment, the first contact area A1 may be in the range of 10 mm² to 30 mm² (i.e., 10 mm²≤A1≤30 mm²), but it is not limited thereto. the first contact area A1 may be between 10 mm² and 20 mm² (i.e., 10 mm²≤A1≤20 mm²), but it is not limited thereto.

As shown in FIGS. 2 and 6, in one embodiment, in the first direction X, the first contact area A1 may have a first contact width d4. In one embodiment, the first contact width d4 may be between 34 mm and 44 mm (i.e., 34 mm≤d4≤44 mm), but it is not limited thereto. In one embodiment, the first contact width d4 may be between 36.5 mm and 41.5 mm (i.e., 36.5 mm≤d4≤41.5 mm), but it is not limited thereto.

Similarly, as shown in FIG. 2 and FIG. 6, the lug portion 111 of the second optical film 11 is fixed on the second support portion 42 through the attachment member 13, and there is a second contact area A2 (shown in FIG. 2) between the lug portion 111 of the second optical film 11 and the attachment member 13 (e.g., each of the two second attachment portions 132). In one embodiment, the second contact area A2 may be between 5 mm$^2$ and 20 mm$^2$ (i.e., 5 mm$^2 \leq$ A2$\leq$20 mm$^2$), but it is not limited thereto. In one embodiment, the second contact area A2 may be between 5 mm$^2$ and 17.5 mm$^2$ (i.e., 5 mm$^2 \leq$A2$\leq$17.5 mm$^2$), but it is not limited thereto. In one embodiment, the second contact area A2 may be between 5 and 15 mm$^2$ (i.e., 5 mm$^2 \leq$A2$\leq$15 mm$^2$), but it is not limited thereto. In one embodiment, the second contact area A2 may be between 5 mm$^2$ to 10 mm$^2$ (i.e., 5 mm$^2 \leq$A2$\leq$10 mm$^2$), but it is not limited thereto.

As shown in FIG. 2 and FIG. 6, in one embodiment, the second contact area A2 may have a second contact width d5 in the first direction X. In one embodiment, the second contact width d5 may be between 14.5 mm and 24.5 mm (i.e., 14.5 mm$\leq$d5$\leq$24.5 mm), but it is not limited thereto. In one embodiment, the second contact width d5 may be between 17 mm and 22 mm (i.e., 17 mm$\leq$d5$\leq$22 mm), but it is not limited thereto.

Similarly, as shown in FIG. 2 and FIG. 6, the lug portion 51 of the first optical film 5 is fixed on the third support portion 43 through the attachment member 13, and there is a third contact area A3 (shown in FIG. 2) between the lug portion 51 of the first optical film 5 and the attachment member 13 (e.g., each of the two third attachment portions 133). In one embodiment, the third contact area A3 may be between 5 mm$^2$ and 20 mm$^2$ (i.e., 5 mm$^2 \leq$A3$\leq$20 mm$^2$), but it is not limited thereto. In one embodiment, the third contact area A3 may be between 5 mm$^2$ and 17.5 mm$^2$ (i.e., 5 mm$^2 \leq$A3$\leq$17.5 mm$^2$), but it is not limited thereto. In one embodiment, the third contact area A3 may be between 5 mm$^2$ and 15 mm$^2$ (i.e., 5 mm$^2 \leq$A3$\leq$15 mm$^2$), but it is not limited thereto. In one embodiment, the third contact area A3 may be between 5 mm$^2$ and 10 mm$^2$ (i.e., 5 mm$^2 \leq$A3$\leq$10 mm$^2$), but it is not limited thereto.

As shown in FIG. 2 and FIG. 6, in one embodiment, the third contact area A3 has a third contact width d6 in the first direction X. In one embodiment, the third contact width d6 may be between 14.5 mm and 24.5 mm (i.e., 14.5 mm$\leq$d6$\leq$24.5 mm), but it is not limited thereto. In one embodiment, the third contact width d6 may be between 17 mm and 22 mm (i.e., 17 mm$\leq$d6$\leq$22 mm), but it is not limited thereto.

As shown in FIG. 7, in the second direction Y, the sealant frame 4d may have a sealant frame width W1. As shown in FIG. 6 and FIG. 7, in one embodiment, the first support portion 41, the two second support portions 42 and/or the two third support portions 43 may have substantially the same width of the sealant frame, but it is not limited thereto. In one embodiment, the width W1 of the sealant frame may be between 0.3 mm and 1 mm (i.e., 0.3 mm$\leq$W1$\leq$1 mm), but it is not limited thereto. In one embodiment, the sealant frame width W1 may be between 0.4 mm and 0.8 mm (i.e., 0.4 mm$\leq$W1$\leq$0.8 mm), but it is not limited thereto. In one embodiment, the sealant frame width W1 may be between 0.4 mm and 0.6 mm (i.e., 0.4 mm$\leq$W1$\leq$0.6 mm), but it is not limited thereto.

In addition, as shown in FIG. 2 and FIG. 7, in the second direction Y, the contact area (e.g., the third contact area A3) between the optical film (e.g., the first optical film 5) and the attachment member 13 (e.g., the third attachment portion 133) may have an overlap width W2, and the overlap width W2 may be between 0.3 mm and 1 mm (i.e., 0.3 mm$\leq$ W2$\leq$1 mm), but it is not limited thereto. In one embodiment, the overlap width W2 may be between 0.4 mm and 0.8 mm (i.e., 0.4 mm$\leq$W2$\leq$0.8 mm), but it is not limited thereto. In one embodiment, the overlap width W2 may be between 0.4 mm and 0.6 mm (i.e., 0.4 mm$\leq$W2$\leq$0.6 mm), but it is not limited thereto. In one embodiment, the sealant frame width W1 may be greater than or equal to the overlap width W2. Similarly, the contact area between the second optical film 11 or the third optical film 12 and the attachment member 13 may have an overlap width (not shown), and the overlap width (not shown) may be between 0.3 mm and 1 mm (i.e., 0.3 mm$\leq$overlap width$\leq$1 mm), between 0.4 mm and 0.8 mm (i.e., 0.4 mm$\leq$overlap width$\leq$0.8 mm) or between 0.4 mm and 0.6 mm (i.e., 0.4 mm$\leq$overlap width$\leq$0.6 mm), but it is not limited thereto. In one embodiment, the sealant frame width W1 may be greater than or equal to the aforementioned overlap width.

As shown in FIG. 2, FIG. 6 and FIG. 7, in one embodiment, the overlap width W2 of the contact area (e.g., the third contact area A3) between the first optical film 5 and the attachment member 13 (e.g., the third attachment portion 133) may be substantially perpendicular to the aforementioned contact width (e.g., the third contact width d6). In other words, when the shape of the third contact area A3 is approximately a rectangle, the size of the third contact area A3 may be calculated by, for example, the product of the overlap width W2 and the third contact width d6, but it is not limited thereto. Similarly, the contact area between another optical film and the corresponding attachment member 13 may also be determined through the aforementioned method.

As a result, the dimensions of the sealant frame 4, the attachment member 13 and the optical films 5, 11, 12 can be understood.

Figure 9A:
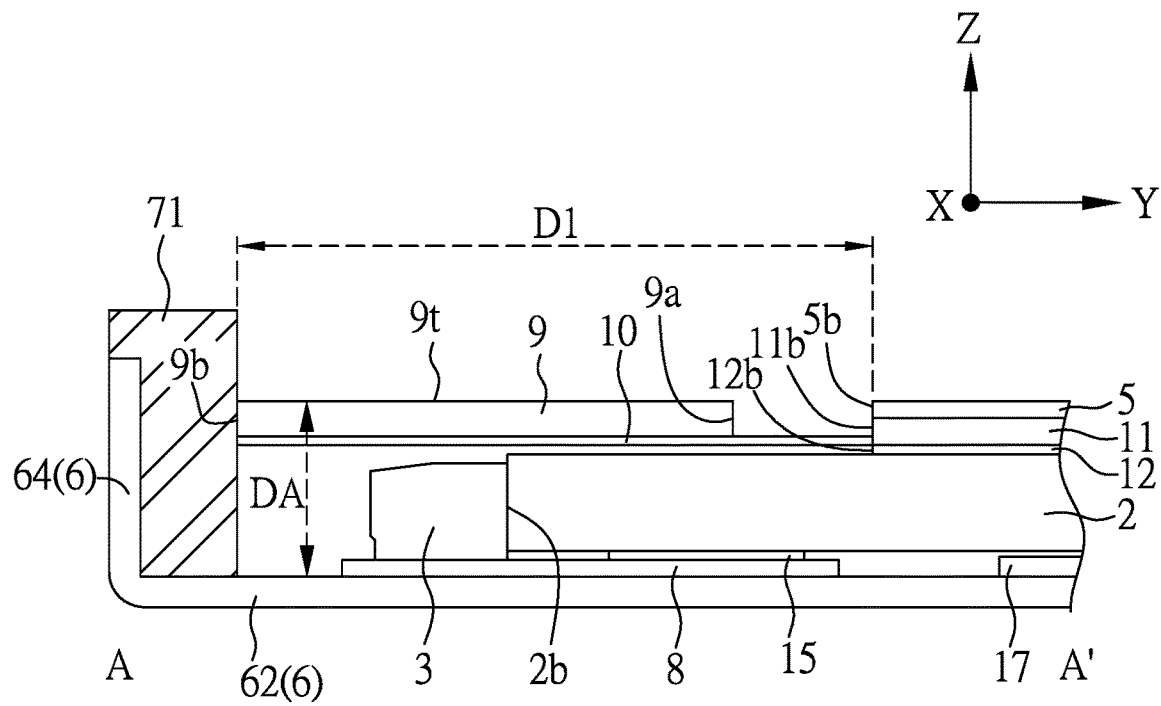
FIG. 9A is a cross-sectional view (front view) of the electronic device in FIG. 8 taking along line A-A'.
Figure 9B:
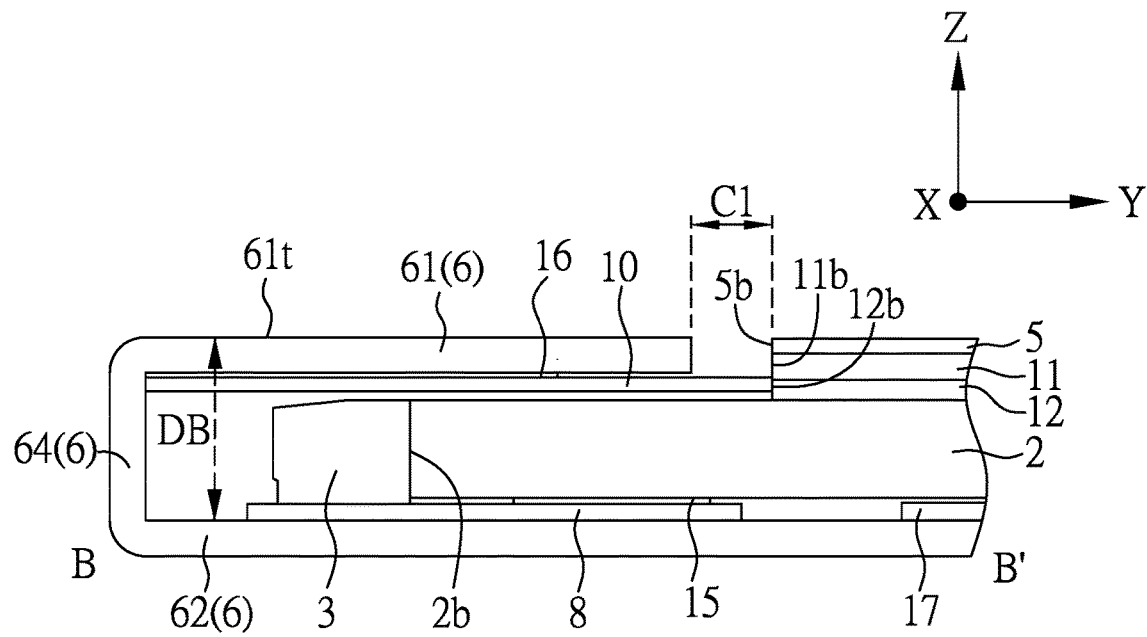
FIG. 9B is a cross-sectional view (front view) of the electronic device of FIG. 8 corresponding to line B-B'.
Figure 10:
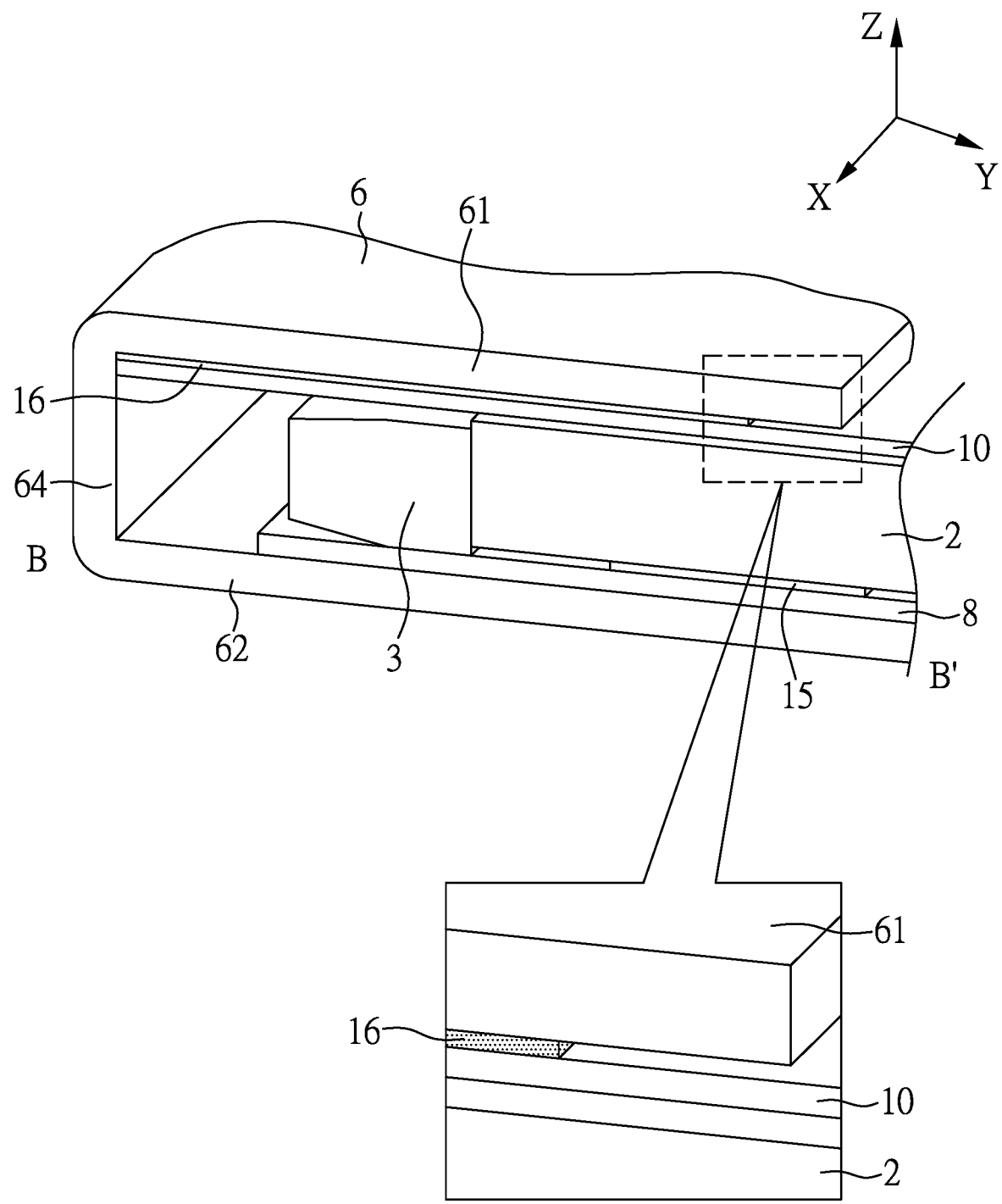
FIG. 10 is a cross-sectional view (perspective view) of the electronic device in FIG. 8 corresponding to the line B-B'.

Next, a second region R2 of the electronic device 1 in FIG. 1 will be described, and please refer to FIG. 1, FIG. 8, FIG. 9A, FIG. 9B and FIG. 10 at the same time. FIG. 8 is a perspective view of the second region R2 of the electronic device 1 in FIG. 1. FIG. 9A is a cross-sectional view (front view) of the electronic device 1 in FIG. 8 taking along line A-A'. FIG. 9B is a cross-sectional view (front view) of the electronic device 1 of FIG. 8 corresponding to line B-B'. FIG. 10 is a cross-sectional view (perspective view) of the electronic device 1 in FIG. 8 corresponding to the line B-B'.

As shown in FIG. 1, FIG. 8 and FIG. 9B, in the second direction Y, the bending portion 61 of the back plate 6 is arranged adjacent to the second side 5b of the first optical film 5, the bending portion 61 of the back plate 6 is arranged adjacent to the second side 11b of the second optical film 11, and the bending portion 61 of the back plate 6 is arranged adjacent to the second side 12b of the third optical film 12. As shown in FIG. 8 and FIG. 9B, there may be a shortest distance C1 between the bending portion 61 and the second side 5b of the first optical film 5, a shortest distance C1 between the bending portion 61 and the second side 11b of the second optical film 11, or a shortest distance C1 between the bending portion 61 and the second side 12b of the third optical film 12. The shortest distances C1 between the bending portion 61 and the second sides of the various optical films may be the same or different from each other. The aforementioned shortest distances C1 may correspond to the space expansion and contraction of the first optical film 5, the second optical film 11 or the third optical film 12 when thermal expansion occurs, but it is not limited thereto.

In one embodiment, the shortest distance C1 may be between 0.3 mm and 0.7 mm (i.e., 0.3 mm$\leq$C1$\leq$0.7 mm), but it is not limited thereto. In one embodiment, the shortest distance C1 may be between 0.4 mm and 0.6 mm (i.e., 0.4 mm$\leq$C1$\leq$0.6 mm), but it is not limited thereto. In one embodiment, the shortest distance C1 may be between 0.45 mm and 0.55 mm (i.e., 0.45 mm≤C1≤0.55 mm), but it is not limited thereto. In addition, as shown in FIG. 1 and FIG. 8, in the first direction X, the back plate 6 has a notch portion S, and the notch portion S is adjacent to the bending portion 62. In one embodiment, in the first direction X, the notch portion S may have a notch width S1, and the notch width S1 may be defined as a shortest distance between a third side plate 65 of the back plate 6 and the bending portion 61 in the first direction X. In one embodiment, the notch width S1 may be greater than or equal to 5 mm (i.e., S1≤5 mm), but it is not limited thereto. In one embodiment, the notch width S1 may be greater than or equal to 4 mm (i.e., S1≤4 mm), but it is not limited thereto. In one embodiment, in the third direction Z, the buffer member 9 may overlap the notch portion S; for example, the buffer member 9 may be arranged on the reflective element 10 corresponding to the notch portion S.

In addition, as shown in FIG. 9A and FIG. 9B, in one embodiment, in the third direction Z, the shortest distance DA between an upper surface 9t of the buffer member 9 and the bottom plate 62 may be approximately equal to the shortest distance DB between an upper surface 61t of the bending portion 61 and the bottom plate 62, but it is not limited thereto. In one embodiment, the material of the buffer member 9 may include an adhesive, and the buffer member 9 may be provided with single-sided adhesiveness or double-sided adhesiveness, but it is not limited thereto. In another embodiment, the buffer member 9 may not be provided with adhesiveness. The buffer member 9 has one side 9a and the other side 9b. The side 9a of the buffer member 9 is adjacent to the first optical film 5, the second optical film 11 and/or the third optical film 12, and the other side 9b of the buffer member 9 is adjacent to the first sealant frame 71. In one embodiment, the side 9a of the buffer member 9 may selectively contact or not contact the first optical film 5, the second optical film 11 or the third optical film 12. In one embodiment, the other side 9b of the buffer member 9 may selectively contact or not contact the first sealant frame 71.

In one embodiment, in the second direction Y, there is a shortest distance between the sealant frame 72 and the second side 5b of the body portion 52 of the first optical film 5, hereinafter referred to as the shortest distance D1. In one embodiment, the shortest distance D1 may be between 3 mm and 5 mm (i.e., 3 mm≤D1≤5 mm), but it is not limited thereto. In one embodiment, the shortest distance D1 may be between 3.5 mm and 5 mm (i.e., 3.5 mm≤D1≤5 mm), but it is not limited thereto. In one embodiment, the shortest distance D1 may be between 3.5 mm and 4.5 mm (i.e., 3.5 mm≤D1≤4.5 mm), but it is not limited thereto.

As shown in FIG. 9B and FIG. 10, in the third direction Z, a third attachment member 16 may be arranged between the reflective element 10 and the bending portion 61. The third attachment member 16 may be used, for example, to fix the reflective element 10 to the bending portion 61. In one embodiment, the material of the third attachment member 16 may include adhesive, such as double-sided adhesive tape, but it is not limited thereto.

The present disclosure may at least compare the presence or absence of components in the electronic device 1 and/or the configuration of the components as evidence for whether an object falls within the scope of patent protection, but it is not limited thereto.

In one embodiment, the electronic device 1 produced in the aforementioned embodiments may be used as a touch device. Furthermore, if the electronic device 1 produced in the aforementioned embodiments of the present disclosure is in the form of a display device or a touch display device, it may be applied to any product known in the art that requires a display screen to display images, such as monitors, mobile phones, notebook computers, video cameras, cameras, music players, mobile navigation devices, TVs, car dashboards, center consoles, electronic rearview mirrors, head-up displays, etc.

As a result, the present disclosure provides an improved electronic device, which may mitigate the problem of bright lines in the prior art through the arrangement of the optical film and the sealant frame. Alternatively, the electronic device of the present disclosure may be applied to a structure with a narrow border.

The features of the various embodiments of the present disclosure may be arbitrarily mixed and matched as long as they do not violate the spirit of the present disclosure or conflict with each other.

The aforementioned specific embodiments should be construed as merely illustrative, and not limiting the rest of the present disclosure in any way.

What is claimed is:

1. An electronic device, comprising:
    a light guide plate having a first end portion and a second end portion opposite to each other;
    a plurality of light sources adjacent to the second end portion and arranged along a first direction;
    a sealant frame adjacent to the first end portion;
    at least one optical film, wherein one of the at least one optical film has a body portion and a lug portion connected to the body portion, and the lug portion is fixed on the sealant frame; and
    a back plate accommodating the light guide plate and including a bending portion,
    wherein the body portion has a first side adjacent to the sealant frame and, in a second direction perpendicular to the first direction, a shortest distance between the first side and the sealant frame is in a range of 0 mm to 0.4 mm;
    wherein the body portion has a second side adjacent to the bending portion and, in the second direction, the shortest distance between the first side and the sealant frame is smaller than a shortest distance between the second side of the body portion and the bending portion;
    wherein the back plate has a notch portion adjacent to the bending portion, and a buffer member overlaps the notch portion.

2. The electronic device as claimed in claim 1, wherein the sealant frame has a first support portion and two second support portions, the two second support portions are respectively disposed on two sides of the first support portion, a shortest distance between a support surface of one of the two second support portions and the bottom plate is greater than a shortest distance between a support surface of the first support portion and the bottom plate in the normal direction of the bottom plate, and an attachment member is arranged on the first support portion and the two second support portions.

3. The electronic device as claimed in claim 2, wherein a width of the first support portion in the first direction is between 20 mm and 60 mm.

4. The electronic device as claimed in claim 2, wherein a width of the one of the two second support portions in the first direction is between 10 mm and 30 mm.

5. The electronic device as claimed in claim 2, wherein a width of the first support portion in the second direction is between 0.3 mm and 1 mm.

6. The electronic device as claimed in claim 2, wherein the lug portion of the one of the at least one optical film is fixed on the first support portion through the attachment member, and a contact area between the lug portion and the attachment is between 10 mm2 and 40 mm2.

7. The electronic device as claimed in claim 2, wherein the sealant frame further has two third support portions respectively disposed on sides of the two second support portions away from the first support portion, a shortest distance between a support surface of one of the two third support portions and the bottom plate is greater than the shortest distance between the support surface of the one of the two second support portions in a normal direction of the bottom plate, and the attachment member is arranged on the two third support portions.

8. The electronic device as claimed in claim 7, wherein a width of the one of the two third support portions in the first direction is between 10 mm and 30 mm.

9. The electronic device as claimed in claim 1, further comprising a reflective element disposed on a side of the bending portion adjacent to the plurality of light sources.

10. The electronic device as claimed in claim 1, wherein the buffer member has one side adjacent to the at least one optical film.

11. The electronic device as claimed in claim 2, further comprising a circuit board arranged on the bottom plate, wherein the plurality of light sources are arranged on and electrically connected to the circuit board, and the light guide plate is arranged on the circuit board.

12. The electronic device as claimed in claim 1, wherein the lug portion protrudes from the first side and extends in a direction away from the body portion and, in the first direction, a width of the lug portion is smaller than a width of the body portion.

13. The electronic device as claimed in claim 7, wherein the sealant frame further includes two connecting portions respectively disposed on sides of the two third support portions away from the second support portion.

14. The electronic device as claimed in claim 2, wherein the back plate further includes a first side plate connected to the bottom plate and extends toward a third direction, and part of the sealant frame is arranged on the bottom plate and the other part of the sealant frame is arranged on the first side plate, where the third direction is perpendicular to the first direction and the second direction.

15. The electronic device as claimed in claim 14, wherein the back plate further includes a second side board extending along the third direction to be away from the bottom plate.

16. The electronic device as claimed in claim 2, further comprising a reflector arranged between the bottom plate and the light guide plate.

17. The electronic device as claimed in claim 1, wherein the at least one optical film includes a first optical film, a second optical film and a third optical film, and the sealant frame has a stepped structure on which the lug portion of the first optical film, the lug portion of the second optical film and the lug portion of the third optical film are arranged.

18. The electronic device as claimed in claim 17, wherein, in a third direction, a projection area of the lug portion of the first optical film is greater than a projection area of the lug portion of the second optical film, and a projection area of the lug portion of the second optical film is greater than a projection area of the lug portion of the third optical film.

19. An electronic device, comprising:
a light guide plate having a first end portion and a second end portion opposite to each other;
a plurality of light sources adjacent to the second end portion and arranged along a first direction;
a sealant frame adjacent to the first end portion; and
at least one optical film, wherein one of the at least one optical film has a body portion and a lug portion connected to the body portion, and the lug portion is fixed on the sealant frame; and
a back plate accommodating the light guide plate and including a bottom plate,
wherein the body portion has a first side adjacent to the sealant frame and, in a second direction perpendicular to the first direction, a shortest distance between the first side and the sealant frame is in a range of 0 mm to 0.4 mm;
wherein the sealant frame has a first support portion and two second support portions, the two second support portions are respectively disposed on two sides of the first support portion, a shortest distance between a support surface of one of the two second support portions and the bottom plate is greater than a shortest distance between a support surface of the first support portion and the bottom plate in the normal direction of the bottom plate, and an attachment member is arranged on the first support portion and the two second support portions.

\* \* \* \* \*